United States Patent
Ohashi

(10) Patent No.: US 6,173,108 B1
(45) Date of Patent: *Jan. 9, 2001

(54) IMAGE SIGNAL RECORDING APPARATUS

(75) Inventor: Kazuhito Ohashi, Kanagawa-ken (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/751,257

(22) Filed: Nov. 18, 1996

Related U.S. Application Data

(63) Continuation of application No. 08/420,447, filed on Apr. 10, 1995, now abandoned, which is a continuation of application No. 08/255,234, filed on Jun. 2, 1994, now abandoned, which is a continuation of application No. 08/013,160, filed on Feb. 1, 1993, now abandoned, which is a continuation of application No. 07/366,449, filed on Jun. 13, 1989, now abandoned.

(30) Foreign Application Priority Data

Jun. 17, 1988 (JP) .................................... 63-149877

(51) Int. Cl.[7] .......................................... H04N 9/82
(52) U.S. Cl. .................................. 386/1; 386/38; 386/44
(58) Field of Search .................................. 386/31, 32, 38, 386/1, 107, 117, 44; 358/906, 909.1; H04N 9/82

(56) References Cited

U.S. PATENT DOCUMENTS

| | | | |
|---|---|---|---|
| 4,246,598 | * | 1/1981 | Bock et al. ............................. 358/12 |
| 4,280,151 | * | 7/1981 | Tsunekawa et al. ................. 360/33.1 |
| 4,541,020 | * | 9/1985 | Kimura ................................. 358/906 |
| 4,543,601 | * | 9/1985 | Harada et al. ....................... 358/209 |
| 4,554,586 | * | 11/1985 | Tanuma et al. ................. 358/213.14 |
| 4,691,245 | * | 9/1987 | Hickok ................................... 358/12 |
| 4,750,041 | * | 6/1988 | Vogel et al. .................... 358/213.13 |
| 4,752,830 | * | 6/1988 | Hickok ................................. 358/310 |
| 4,757,391 | * | 7/1988 | Hirota ................................. 358/310 |
| 4,760,469 | * | 7/1988 | Biber et al. .......................... 358/310 |
| 4,779,142 | * | 10/1988 | Freeman et al. .................... 358/906 |
| 4,805,010 | * | 2/1989 | Shroyer et al. ..................... 358/909 |
| 4,829,368 | * | 5/1989 | Kobayashi et al. ............ 358/213.26 |
| 4,858,025 | * | 8/1989 | Tabei ................................... 358/310 |
| 4,903,122 | * | 2/1990 | Ozaki et al. ......................... 348/237 |

FOREIGN PATENT DOCUMENTS 34-72283   4/1959  (JP) .

OTHER PUBLICATIONS

William J. Hawkins, 3–D Camcorder, Jan. 1988, Popular Science, 56.*

* cited by examiner

Primary Examiner—Huy Nguyen
(74) Attorney, Agent, or Firm—Robin, Blecker & Daley

(57) ABSTRACT

An image signal recording apparatus for recording, on a recording medium, image signals corresponding to an image in which one picture is composed of a plurality of horizontal scanning lines is arranged to store the image signals for one picture, to simultaneously output N kinds (N: an integer at least 2) of image signals corresponding to N number of horizontal scanning lines adjacently located on the picture, and to simultaneously record, in different areas on the recording medium, the N kinds of image signals. This arrangement enables the apparatus to record an image signal of a high picture quality on the recording medium with a high degree of density.

12 Claims, 10 Drawing Sheets

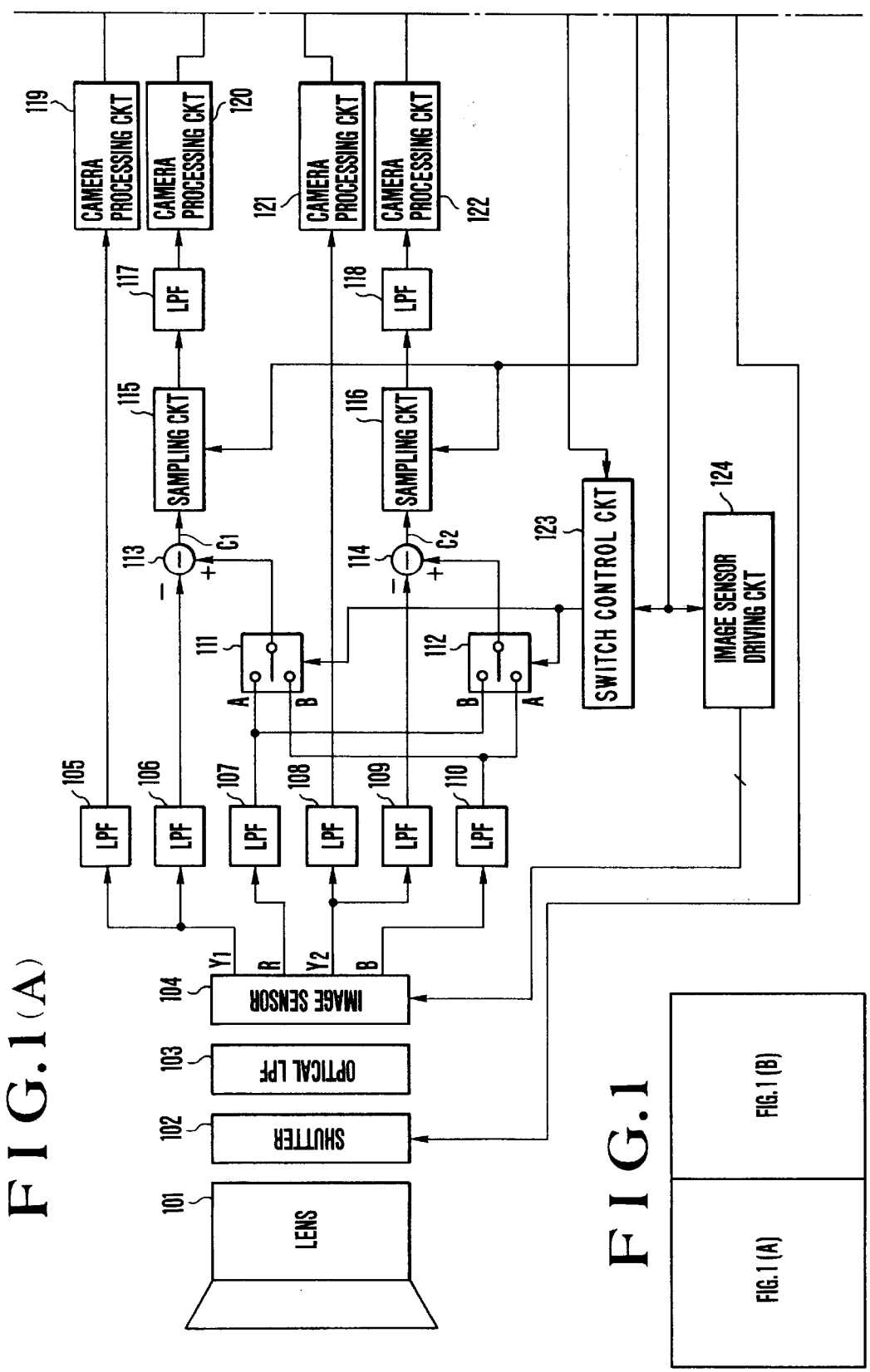

LUMINANCE SIGNAL

R SIGNAL

B SIGNAL

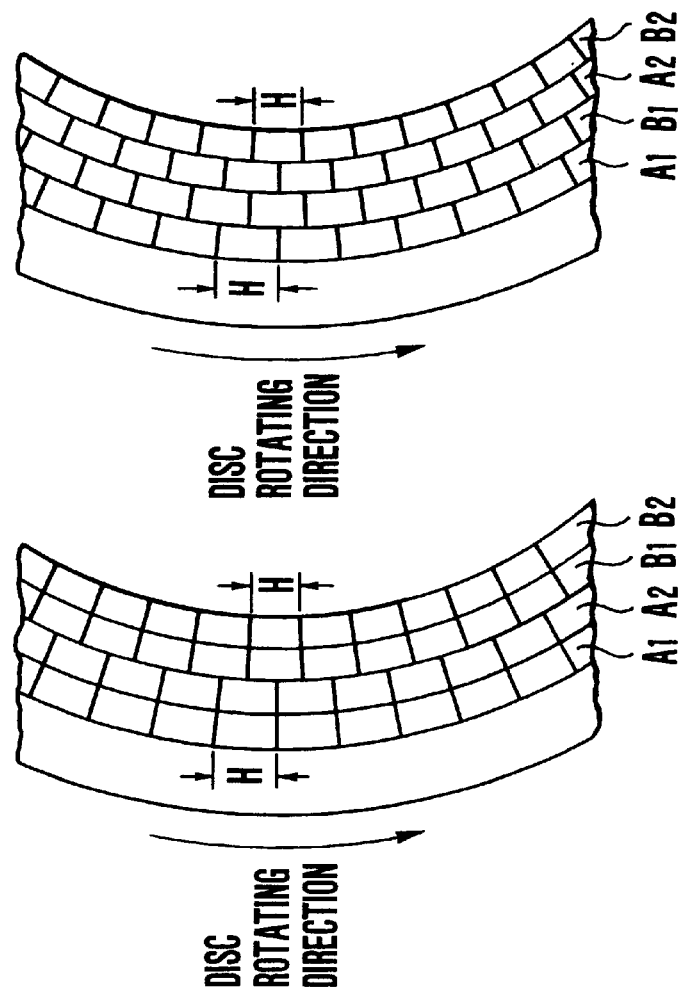
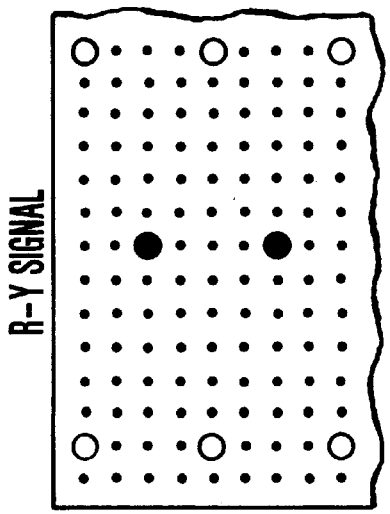
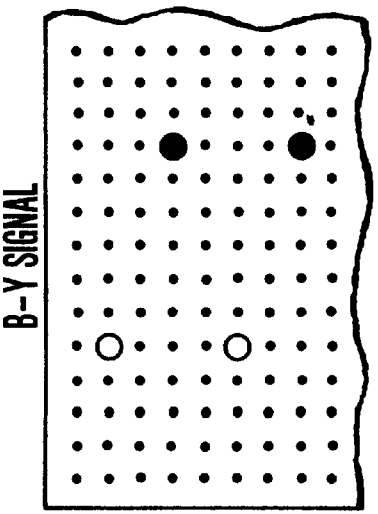

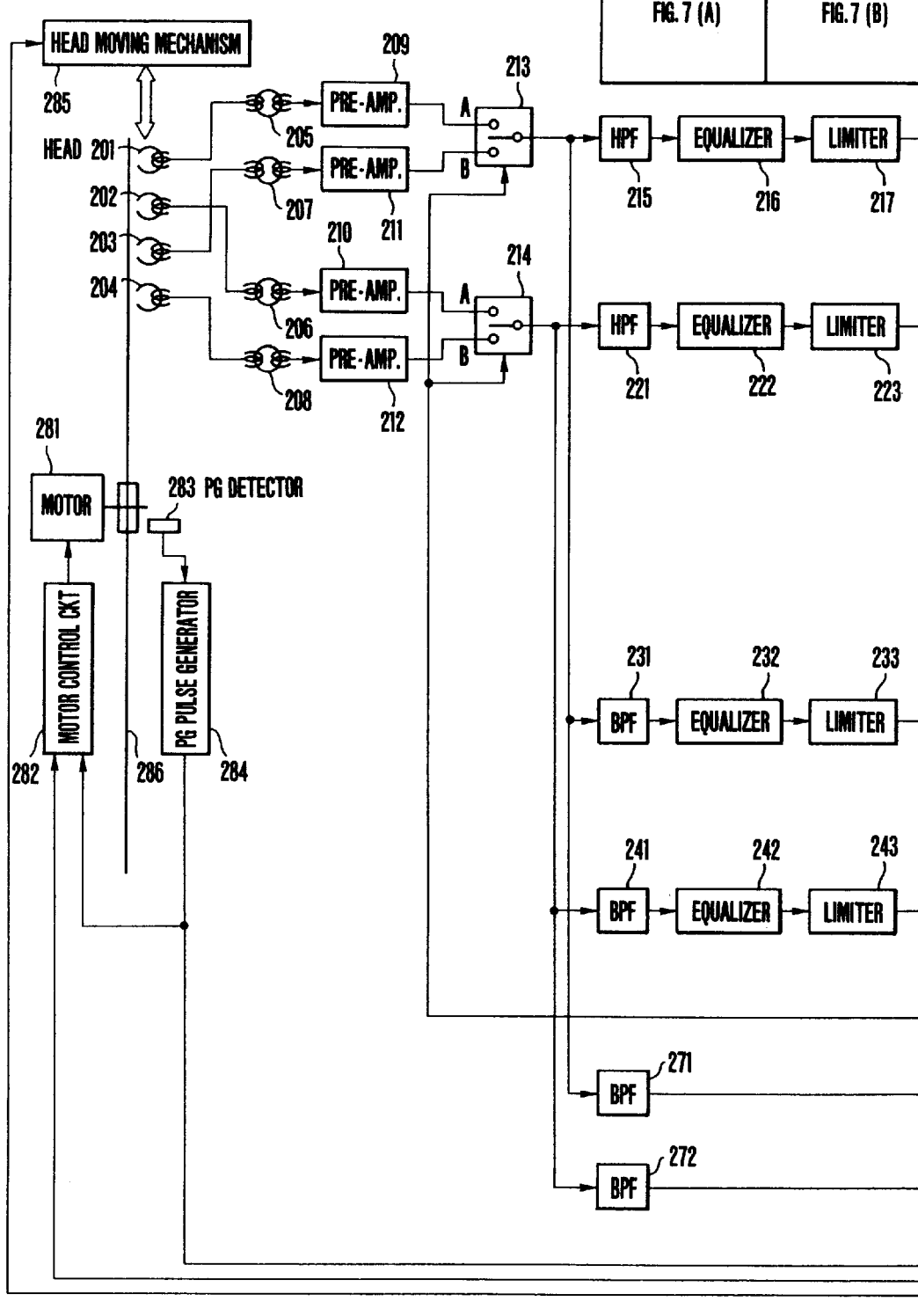

Y SIGNAL

AT THE TIME OF RECORDING → INTERPOLATION PROCESSING → AT THE TIME OF REPRODUCTION

R SIGNAL

AT THE TIME OF RECORDING → INTERPOLATION PROCESSING → AT THE TIME OF REPRODUCTION

B SIGNAL

AT THE TIME OF RECORDING → INTERPOLATION PROCESSING → AT THE TIME OF REPRODUCTION

FIG.9

| Y  | Ye | Y  | Ye | Y  | Ye |
|----|----|----|----|----|----|
| Cy | Y  | Cy | Y  | Cy | Y  |
| Y  | Ye | Y  | Ye | Y  | Ye |
| Cy | Y  | Cy | Y  | Cy | Y  |
| Y  | Ye | Y  | Ye | Y  | Ye |

FIG.10

| Y  | R | Y  | R | Y  | R |
|----|---|----|---|----|---|
| Cy | Y | Cy | Y | Cy | Y |
| Y  | R | Y  | R | Y  | R |
| Cy | Y | Cy | Y | Cy | Y |
| Y  | R | Y  | R | Y  | R |

IMAGE SIGNAL RECORDING APPARATUS

This is a continuation application under 37 CFR 1.62 of prior application Ser. No. 08/420,447 filed Apr. 10, 1995 now abandoned, which is a continuation of Ser. No. 08/255,234, filed Jun. 2, 1994, abandoned, which is a continuation of Ser. No. 08/013,160, filed Feb. 1, 1993, abandoned, which is a continuation of Ser. No. 07/366,449, filed Jun. 13, 1989, abandoned.

BACKGROUND OF THE INVENTION

1. Field of the Invention

This invention relates to an image signal recording apparatus for recording an image signal on a recording medium.

2. Description of the Prior Art

The known recording and/or reproducing apparatuses for recording or reproducing a video signal obtained by image sensing means, such as a video camera, on or from a recording medium such as a magnetic disc include an apparatus called an electronic still video camera.

The currently known electronic still video camera is capable of recording or reproducing only a TV signal which is in conformity to the currently prevalent TV system, such as the NTSC system. In the case of the TV signal conforming to the NTSC system, the still video camera is arranged to have 525 scanning lines per frame and about 350 TV horizontal resolution.

However, recent improvement in the picture quality of the video tape recorder has come to stimulate a strong desire for improvement in the picture quality of the electronic still video camera. Since the electronic still video camera is for recording and reproducing still images, the currently attainable resolution is hardly satisfactory. Further, the quality of a picture printed with a video signal reproduced from the magnetic disc is much inferior to that of a picture taken by a camera of the silver-halide type.

Further, a novel TV system of a high picture quality called a high-definition TV system has lately been proposed and is now under experiments. For any electronic still video camera that is capable of matching with this new TV system, the currently prevalent recording and reproduction format is hardly usable as it is for recording and reproduction. Besides, another problem resides in that, even if any new format is developed to enable the still video camera to match with the new TV system, it would be difficult to have interchangeability between the still video cameras adapted for the new and old formats.

For recording, on a recording medium such as a magnetic disc or the like, a still image signal adapted for the above-stated TV system of a high picture quality, it is conceivable to perform multi-channel recording by simultaneously using a plurality of magnetic heads for a plurality of channels. This method, however, encounters a cross-talk problem arising between the magnetic heads if these heads are narrowly spaced for the purpose of increasing the recording capacity of the magnetic medium.

SUMMARY OF THE INVENTION

It is a general object of the invention to solve the above-stated problems of the prior art.

It is a more specific object of the invention to provide an image signal recording apparatus which is capable of recording an image signal of a high picture quality with a high density on a recording medium.

Under this object, an image signal recording apparatus arranged, according to the invention in one mode of embodiment thereof, to record, on a recording medium, image signals corresponding to an image in which one picture is composed of a plurality of horizontal scanning lines comprises:

image signal output means for storing the image signals for one picture and simultaneously outputting N kinds of image signals corresponding respectively to N number of horizontal scanning lines which are adjacent to each other on the picture, N being an integer not less than 2; and recording means for simultaneously recording the N kinds of image signals output from the image signal output means in different areas on the recording medium.

It is another object of the invention to provide an image signal recording apparatus which is capable of recording on a recording medium an image signal of a high band without deteriorating the image signal.

Under that object, an image signal recording apparatus arranged, according to the invention in one mode of embodiment thereof, to record image signals on a recording medium comprises:

image sensing means for sensing an image of an object to be photographed, forming image signals corresponding to the object image, and simultaneously outputting a first image signal corresponding to a first part of the object image and a second image signal corresponding to a second part of the object image which is different from the first part; and recording means for simultaneously recording in different areas on the recording medium the first and second image signals which are simultaneously output from the image sensing means.

The above and other objects and features of the invention will become apparent from the following detailed description of embodiments thereof taken in connection with the accompanying drawings.

BRIEF DESCRIPTION OF THE DRAWINGS

FIGS. 1, 1(A) and 1(B) are block diagrams showing in outline the arrangement of the recording part of an electronic still video camera system to which this invention is applied as an embodiment thereof.

FIGS. 5(A) and 5(B) show the allocation of picture elements corresponding to signals output from a sampling circuit of FIGS. 1, 1(A) and 1(B).

FIGS. 6(A) and 6(B) show track patterns obtained on a magnetic disc when high-definition color image signals are recorded.

FIGS. 7, 7(A) and 7(B) are block diagrams showing in outline the arrangement of the reproducing part of the electronic still video camera system of the same embodiment.

FIGS. 9 and 10 show filter arrangements as another embodiment of the invention.

DETAILED DESCRIPTION OF THE PREFERRED EMBODIMENTS

Figure 1B:
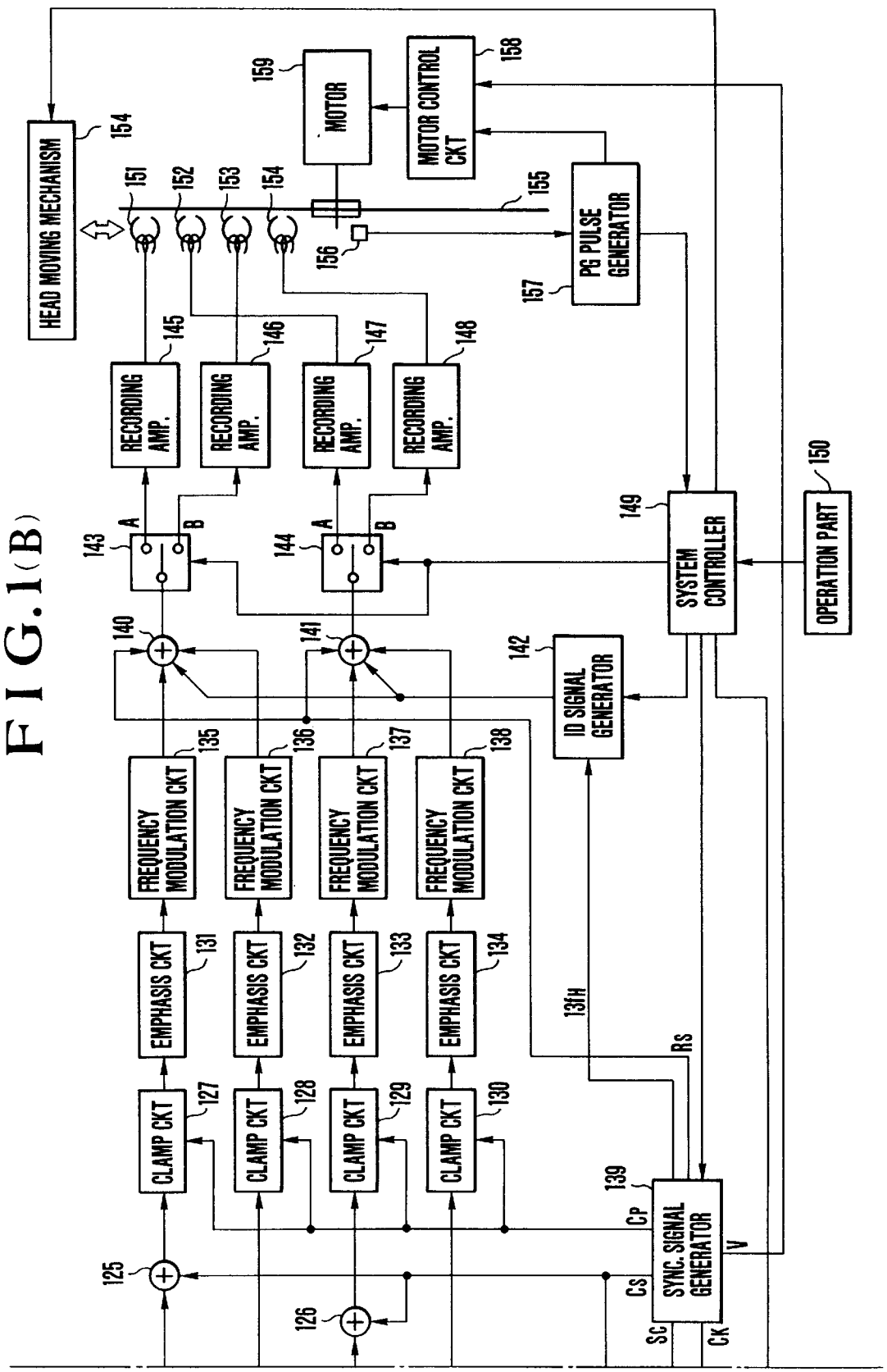

The following describes one embodiment of the invention: FIGS. 1, 1(A) and 1(B) show in outline the arrangement of the recording part of an electronic still video camera system to which the invention is applied. The recording operation of the recording part shown in FIGS. 1, 1(A) and 1(B) are as follows: Referring to FIGS. 1, 1(A) and 1(B), when an instruction is given from an operation part 150 to a system controller 149 to start a recording operation, an incident light flux which represents an image of an object (not shown) comes via an optical lens 101, a shutter 102 which operates under the control of the system controller 149, and an optical low-pass filter (LPF) 103. The incident light is then supplied to the image sensing plane of a solid-state image sensor 104 to form the image of the object on the image sensing plane of the solid-state image sensor 104. The solid-state image sensor 104 is provided with about 1000 picture elements in the horizontal direction and about 1000 picture elements in the vertical direction.

Figure 2:
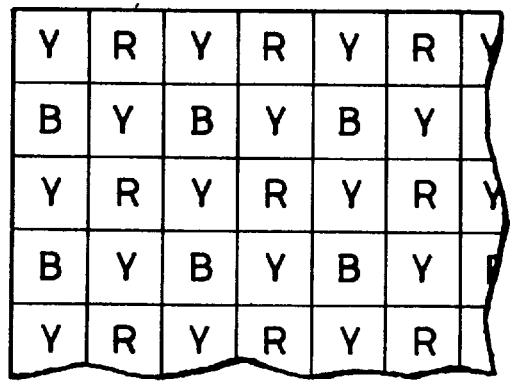
FIG. 2 shows a filter arrangement provided on the image sensing plane of a solid-state image sensor used for the recording part of the electronic still video camera system of FIGS. 1, 1(A) and 1(B).

The image sensing plane of the solid-state image sensor 104 is provided with a filter consisting of filter parts for luminance (Y) which are arranged in a checkered manner and filter parts for red (R) and blue (B) which are arranged in a line-sequential manner as shown in FIG. 2. When the system controller 149 is instructed by the operation part 150 to initiate a recording action, the system controller 149 instructs a synchronizing (hereinafter referred to as sync for short) signal generator 139 to begin to operate. The sync signal generator 139 supplies a clock signal Ck to an image sensor driving circuit 124. The image sensor driving circuit 124 then drives the solid-state image sensor 104 in synchronism with the clock signal Ck.

Figure 3:
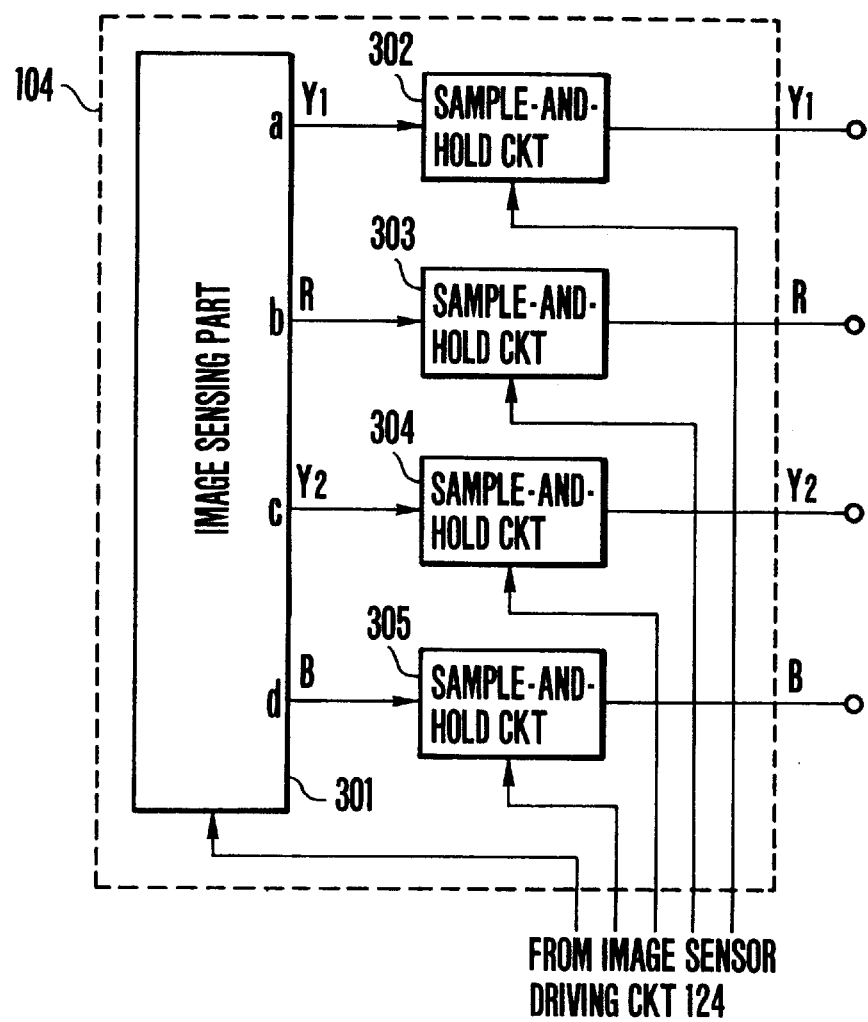
FIG. 3 is a block diagram showing the arrangement of the solid-state image sensor of FIGS. 1, 1(A) and 1(B).

Referring to FIG. 3, the solid-state image sensor 104 used for this embodiment consists of an image sensing part 301 and sample-and-hold circuits 302, 303, 304 and 305. The image sensing part 301 is arranged to be capable of reading out image signals for two lines at the same time and at intervals of two lines. For example, a MOS type solid-state image sensor is used for the image sensing part 301. The image sensing part 301 is driven by the image sensor driving circuit 124 to output image signals for two lines at intervals of two lines. Of these two lines, the image sensing part 301 outputs a luminance signal Y1 on the upper line from a terminal "a" thereof; a luminance signal Y2 on the lower line from a terminal "c"; a red (R) signal from a terminal "b"; and a blue (B) signal from a terminal "d". As shown in FIG. 3, these signals are supplied to sample-and-hold circuits 302 to 305. At the sample-and-hold circuits 302 to 305, the signals output from the image sensing part 301 are sampled and held according to sample-and-hold timing signals output from the image sensor driving circuit 124 and, then, are output.

Figure 4A:
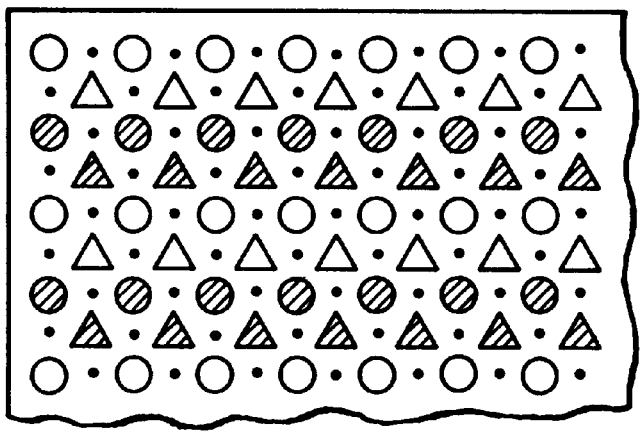
FIGS. 4(A), 4(B) and 4(C) show the allocation of picture elements corresponding to signals output from the solid-state image sensor of FIGS. 1, 1(A) and 1(B).
Figure 4B:
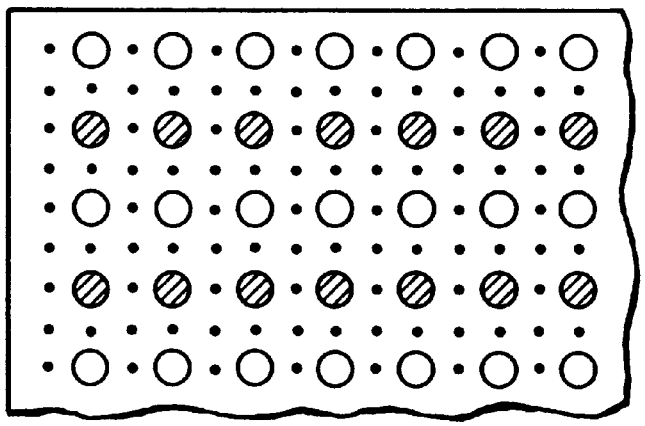
Figure 4C:
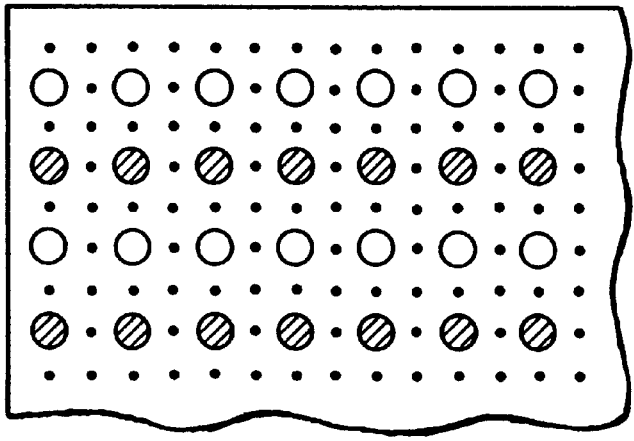

The allocation of picture elements corresponding to the various signals output from the solid-state image sensor 104 is shown in FIGS. 4(A), 4(B), 4(C) and 4(D). FIG. 4(A) shows the luminance signal, with circle marks indicating the picture elements representing the luminance signal Y1 and triangle marks indicating the picture elements representing the luminance signal Y2. FIG. 4(B) shows the R signal, and FIG. 4(C) shows the B signal. Of these marks, white marks indicate the picture elements which produce outputs during an odd-number field period, and hatched marks indicate the picture elements which produce outputs during an even-number field period.

The various signals output from the solid-state image sensor 104 as mentioned above are supplied to low-pass filters (LPFs) 105 to 110 as shown in FIG. 1(A). The LPFs 105 and 108 are arranged to be capable of causing a luminance signal of a wide band of 6.5 MHz to pass through. Any redundant frequency components of the luminance signals Y1 and Y2 are removed by the LPFs 105 and 108. After the removal of redundant frequency components, the luminance signals Y1 and Y2 are supplied to camera processing circuits 119 and 121, respectively. The LPFs 106, 107, 109 and 110 each are arranged to cause a signal of a frequency band of 1 MHz to pass through. With their redundant frequency components removed by these LPFs, the R signal is supplied to the terminal A of a change-over switch 111 and the terminal B of a change-over switch 112, while the B signal is supplied to the terminal B of the switch 111 and the terminal A of the switch 112.

The switching actions of the switches 111 and 112 are controlled by a switch control circuit 123. In synchronism with a composite sync signal Cs supplied from the sync signal generator 139, the switch control circuit 123 causes the connecting position of each of the change-over switches 111 and 112 to be alternately shifted between the terminals A and B at intervals of a horizontal sync period. The R and B signals are thus supplied to the positive terminals of subtracters 113 and 114. Meanwhile, to the negative terminals of the subtracters 113 and 114 are supplied the luminance signals Y1 and Y2 which have their redundant frequency components removed by the LPFs 106 and 109. The subtracters 113 and 114 thus output color-difference line-sequential signals C1 and C2 in which the order of R-Y and B-Y signals is inverted relative to each other. The signals C1 and C2 are supplied to sampling circuits 115 and 116, respectively.

In the format for the still video camera system, the bandwidth of a color-difference line-sequential signal is about ⅙ of that of a luminance signal. Therefore, the bands of the color-difference line-sequential signals output from the subtracters 113 and 114 must be narrowed by thinning out them as shown in FIGS. 5(A) and 5(B). For this purpose, the color-difference line-sequential signals C1 and C2 output from the subtracters 113 and 114 are thinned out by the sampling circuits 115 and 116 which are arranged to perform sampling in synchronism with a sampling clock signal Sc output from the sync signal generator 139. The signals C1 and C2 which have been thus thinned out are supplied to LPFs 117 and 118 which are arranged to cause signals of a band of 1 MHz to pass through. The signals C1 and C2 whose redundant frequency components have been removed by the LPFs 117 118 are then respectively supplied to camera processing circuits 120 and 122.

FIGS. 5(A) and 5(B) show the allocation of picture elements corresponding to the color-difference line-sequential signals C1 and C2 output from the sampling circuits 115 and 116. Of these figures FIG. 5(A) shows the picture elements corresponding to the signal R-Y, and FIG. 5(B) shows the picture elements corresponding to the signal B-Y. In these figures, circle marks represent the picture elements which produce outputs during an odd-number field period, and blackened circle marks represent the picture elements which produce outputs during an even-number field period.

The luminance signals Y1 and Y2 which have been band-limited by the LPFs 105 and 108 are supplied to the camera processing circuits 119 and 121 to undergo various signal processing actions including gamma correction. The outputs of the camera processing circuits 119 and 121 are supplied to adders 125 and 126 as shown in FIGS. 1, 1(A) and 1(B).

A composite sync signal Cs generated by the sync signal generator 139 is supplied to the adders 125 and 126. At the adders 125 and 126, the composite sync signal Cs is multiplexed with the luminance signals Y1 and Y2 which have been processed as mentioned above by the camera processing circuits 119 and 121. The outputs of the adders 125 and 126 are supplied to clamp circuits 127 and 129. The clamp circuits 127 and 129 perform clamping in synchronism with a clamp pulse Cp output from the sync signal generator 139.

The luminance signals Y1 and Y2 which have the composite sync signal added thereto and undergone the clamp process as mentioned above are supplied to emphasis circuits 131 and 133 and, then, to frequency modulation circuits 135 and 137. Through these circuits 131, 133, 135 and 137, the luminance signals Y1 and Y2 are converted into frequency-modulated luminance signals conforming to the known format of the electronic still video camera. The frequency-modulated luminance signals are then supplied to adders 140 and 141.

The color-difference line-sequential signals C1 and C2 which have been band-limited by the LPFs 117 and 118 are supplied to camera processing circuits 120 and 122. At the camera processing circuits 120 and 122, the signals C1 and C2 undergo various processes including gamma correction and are then supplied to clamp circuits 128 and 130. At the clamp circuits 128 and 130, a clamping process is performed in the known manner according to the clamp pulse Cp output from the sync signal generator 139. After that, the signals C1 and C2 are supplied to emphasis circuits 132 and 134 and, then, to frequency modulation circuits 136 and 138 to be converted into frequency-modulated color-difference line-sequential signals conforming to the known format of the electronic still video camera. After that, the signals C1 and C2 are supplied to the adders 140 and 141.

Further, an ID signal generator 142 generates an index (ID) signal corresponding to information (such as the recording year, month and day or the recording hour, minute and second) which is set prior to recording at the system controller 149 in response to the operation of the operation part 150. The ID signal is generated in synchronism with a signal 13fH output from the sync signal generator 139 and having a frequency 13 times as high as the frequency of the horizontal sync signal H and is generated at least at a part of a period corresponding to the vertical fly-back time of the video signal. The ID signal is supplied to the adders 140 and 141.

A reference signal Rs is recorded along with the image information signal in such a way as to permit time base correction during reproduction for mitigating the adverse effect of time base variations taking place during a reproducing operation. Further, the reference signal Rs is generated by the sync signal generator 139 in the form of a sinusoidal signal having a frequency near to 3 MHz which is a boundary between the frequency-modulated luminance signal and the frequency-modulated color-difference line-sequential signal. The sync signal generator 139 supplies the reference signal Rs to the adders 140 and 141.

As mentioned above, the adder 140 receives the frequency-modulated luminance signal Y1, the frequency-modulated color-difference line-sequential signal C1, the ID signal and the reference signal Rs. At the adder 140, the above-stated four different signals are frequency-multiplexed together. As a result, one frame amount of recording video signal conforming to the known format of the electronic still video camera is output from the adder 140 and supplied to a field change-over switch 143. Meanwhile, to the other adder 141 are supplied the frequency-modulated luminance signal Y2, the frequency-modulated color-difference line-sequential signal C2, the ID signal and the reference signal Rs. The adder 141 frequency-multiplexes these four different signals to output therefrom also one-frame amount of recording video signal conforming to the known format of the electronic still video camera. The recording video signal is supplied to a field change-over switch 144.

The magnetic disc 155 is driven to rotate by a motor 159 prior to an instruction from the operation part 150 for the start of recording. The motor 159 is controlled by the motor control circuit 158 to rotate at a given phase relative to a vertical sync signal V output from the sync signal generator 139. More specifically, the position of a PG pin (not shown) which is disposed on the magnetic disc 155 is detected by a PG detector 156. Every time the PG pin moves past the PG detector 156, a PG pulse generator 157 generates a PG detection pulse. The PG detection pulse thus generated and the vertical sync signal V generated by the sync signal generator 139 are supplied to the motor control circuit 158. The motor 159 is controlled by the motor control circuit 158 in such a way as to have the PG detection pulse and the vertical sync signal V in a given phasic relation to each other. The magnetic disc 155 is thus caused to rotate in synchronism with the vertical sync signal V by virtue of this control.

Further, the PG detection pulse output from the PG pulse generator 157 is supplied to the system controller 149. In synchronism with the PG detection pulse, the system controller 149 shifts the connecting position of each of the field change-over switches 143 and 144 between one side A and the other side B as shown in FIG. 1(B) With the switches 143 and 144 operated in this manner, the recording video signals output from the adders 140 and 144 are supplied to recording amplifiers 145 to 148 from the switches 143 and 144 by switching them from one over to another for every field amount of recording video signal. The recording video signals are amplified by the recording amplifiers 145 to 148 and are supplied to magnetic heads 151 to 154 which are aligned along the radius of the magnetic disc 155 as shown in FIG. 1(B). The magnetic heads 151 to 154 then record the recording video signals on the magnetic disc 155. Further, the magnetic heads 151 to 154 are arranged to be radially shiftable over the magnetic disc 155. In response to an operation performed on the operation part 150, the system controller 149 supplies a shift instruction signal to a head moving mechanism 145. Then, in response to this signal, the heads 151 to 154 are moved to any desired position on the magnetic disc 155.

As a result of the above-stated operation, a high-definition color image signal obtained by the solid-state image sensor 104 is recorded in four concentric recording tracks on the magnetic disc 155. A track pattern is then obtained on the magnetic disc 155 as shown in FIG. 6(A).

Referring to FIG. 6(A), a track A1 is formed for recording by the magnetic head 151, a track A2 by the head 152, a track Bi by the head 153 and a track B2 by the head 154 respectively. As shown, signals are recorded in the adjacent tracks A1 and A2 or in the adjacent tracks B1 and B2 to have their horizontal sync periods coincide with each other in a state called "H alignment". This minimizes the adverse effect of the cross talk arising between the magnetic heads during the process of recording. During a reproducing operation, a frame image signal can be reproduced in conformity to the format of the conventional electronic still video camera system by reproducing the records of adjacent tracks A2 and B1.

Referring further to FIG. 1(B), if the output of the recording amplifier 146 is arranged to be supplied to the magnetic head 152 and the output of the recording amplifier 147 is arranged to be supplied to the magnetic head 153, a track pattern on the magnetic disc 155 is obtained as shown in FIG. 6(B). In the case of FIG. 6(B), the track A1 is formed for recording by the magnetic head 151, the track B1 by the head 152, the track A2 by the head 153 and the track B2 by the head 154. The recording signals output from the recording amplifiers 145 and 147 during an odd-number field period are simultaneously supplied to the magnetic heads 151 and 153 which are separate by an extent corresponding to one track from each other. The recording signals output from the recording amplifiers 146 and 148 during an even-number field period are simultaneously supplied to the magnetic heads 152 and 154 which are also separate by the extent of one track from each other. Therefore, as shown, the tracks A1 and A2 or the tracks B1 and B2 are in the state of "H alignment". This arrangement reduces the adverse effect of the cross talk taking place between recording heads during the process of recording. Besides, during reproduction, a frame image signal can be reproduced in conformity to the format of the conventional electronic still video camera system by reproducing the records of adjacent tracks A1 and B1 or those of adjacent tracks A2 and B2.

Figure 7B:
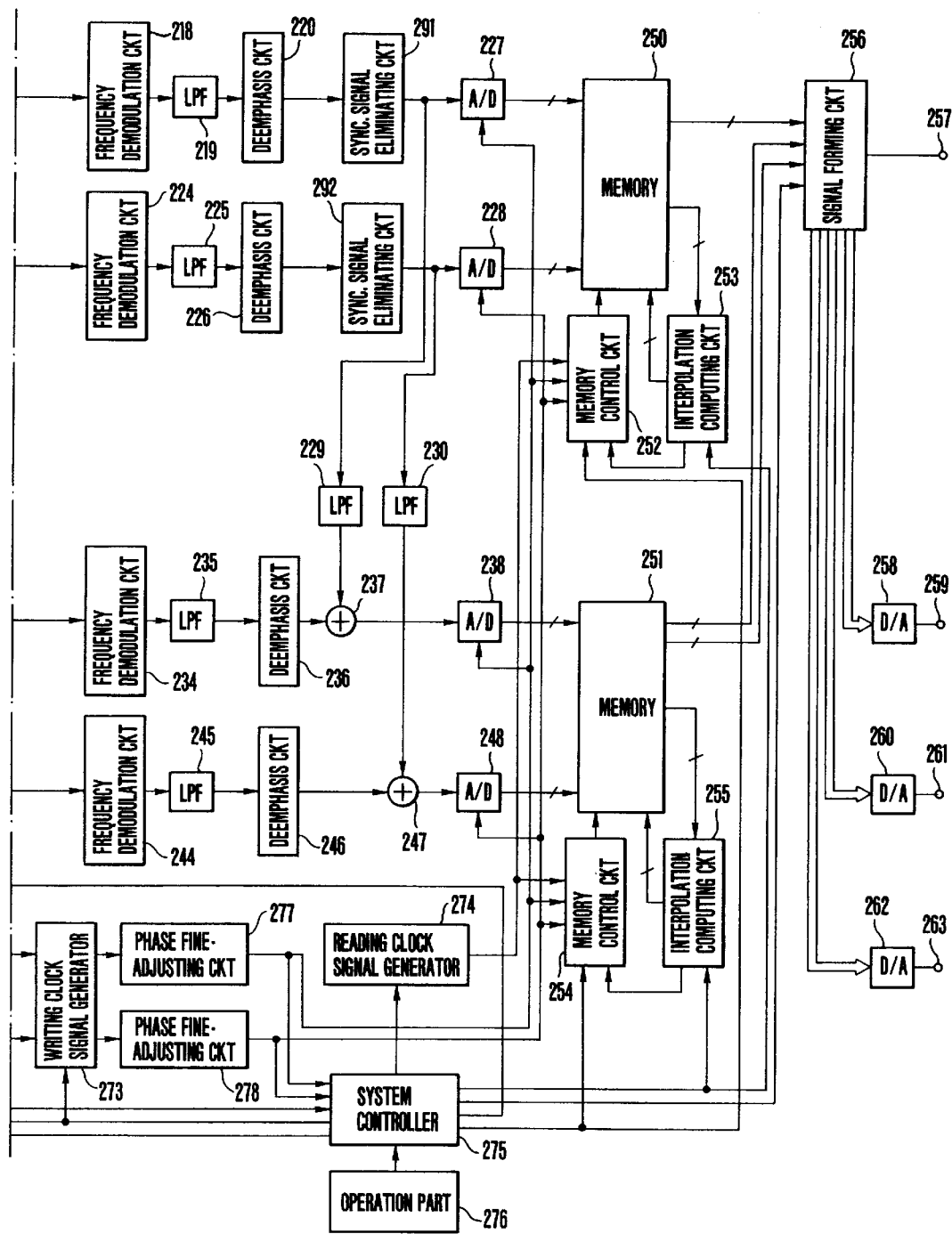

FIGS. 7, 7(A) and 7(B) are block diagrams showing in outline the arrangement of the reproducing part of the electronic still video camera system of the same embodiment. The reproducing operation in the reproducing part of the electronic still video camera system of FIGS. 7, 7(A) and 7(B) is as follows: The reproducing part is arranged to be capable of reproducing image signals recorded in conformity with the format of the conventional still video camera system as well as high-definition image signals. In the following description, the reproducing part is assumed to reproduce a high-definition image signal.

Referring to FIGS. 7, 7(A) and 7(B), when an instruction is given for a start of a reproducing operation and a reproducing track number from an operation part 276, a system controller 275 instructs a head moving mechanism 285 to move magnetic heads 201, 202, 203 and 204 onto recording tracks of a magnetic disc 286 designated by the operation part 276.

Meanwhile, when an instruction is given for a start of a reproducing operation, the system controller 275 instructs a motor control circuit 282 to operate. The motor control circuit 282 controls a motor 281 which is arranged to drive a magnetic disc 286 to rotate at a given phase relative to a vertical sync signal V supplied from the system controller 275. More specifically, the position of a PG pin (not shown) which is disposed on the magnetic disc 286 is detected by a PG detector 283. A PG pulse generator 284 generates a PG pulse every time the PG pin goes past the PG detector 283. The PG pulse thus generated and the vertical sync signal V generated by the system controller 275 are supplied to the motor control circuit 282. The motor control circuit 282 controls the motor 281 to have the PG pulse and the vertical sync signal V to be in a given phasic relation to each other. The magnetic disc 286 then rotates in synchronism with the vertical sync signal V.

As mentioned in the foregoing, the magnetic heads 201, 202, 203 and 204 are moved onto desired tracks which are adjacent to each other on the magnetic disc. When the rotation of the magnetic disc 286 caused by the motor 281 becomes stable, signals reproduced from the magnetic disc 286 by the magnetic heads 201, 202, 203 and 204 are amplified by transformers 205, 206, 207 and 208. The reproduced signals are further amplified by pre-amplifiers 209, 210, 211 and 212. The reproduced signals amplified by the pre-amplifiers 209 and 211 are supplied to a field change-over switch 213, and the reproduced signal amplified by the pre-amplifiers 210 and 212 are supplied to a field change-over switch 214 respectively.

The field change-over switches 213 and 214 are arranged to have their change-over actions controlled by the system controller 275. The system controller 275 is arranged to receive the PG pulse output from the PG pulse generator 284 and to cause the connecting position of each of the field change-over switches 213 and 214 to shift between one side A and the other side B in synchronism with the PG pulse. This switching action causes the field change-over switches 213 and 214 to simultaneously output the signals reproduced by the magnetic heads 201 and 202. Following this, the signals reproduced by the other magnetic heads 203 and 204 are simultaneously output from the switches 213 and 214.

In the case of FIGS. 7, 7(A) and 7(B), the reproducing part is arranged to reproduce from the magnetic disc 286 the signal recorded thereon in a track pattern shown in FIG. 6(A) by the recording part shown in FIGS. 1, 1(A) and 1(B). In a case where the reproducing part is required to reproduce signals recorded on the magnetic disc 286 in a track pattern shown in FIG. 6(B), the magnetic head 202 is connected to the transformer 207, the magnetic head 203 is connected to the transformer 206, and the field change-over switches 213 and 214 shift their connecting positions between their sides A and B in synchronism with the PG pulse output from the PG pulse generator 284. Then, the signals reproduced by the magnetic heads 201 and 203 are simultaneously output from the switches 213 and 214. Following this, signals reproduced by the other magnetic heads 202 and 204 are simultaneously output from the switches 213 and 214.

The signals output from the field change-over switches 213 and 214 are supplied to high-pass filters (HPFs) 215 and 221 and band-pass filters (BPFs) 231, 241, 271 and 272. The HPFs 215 and 221 are arranged to extract frequency-modulated luminance signals from the reproduced signals received through the field change-over switches 213 and 214. The frequency-modulated luminance signals thus extracted are supplied to equalizer circuits 216 and 222 to have their frequency characteristic corrected. The outputs of the equalizer circuits 216 and 222 are supplied to limiter circuits 217 and 223 to be suppressed to a given level for the purpose of preventing inversion. After that, these signals are frequency-demodulated by frequency demodulation circuits 218 and 224. The demodulated signals are supplied to LPFs 219 and 225 to have redundant frequency components removed therefrom. The outputs of the LPFs 219 and 225 are supplied to deemphasis circuits 220 and 226 to undergo a process reverse to the emphasizing process performed for recording. The deemphasized signals are output as luminance signals including sync signals.

The BPFs 231 and 241 extract frequency-modulated color-difference line-sequential signals from the reproduced signals received through the field change-over switches 213 and 214. Then, like in the case of the above-stated luminance signals, the extracted frequency-modulated color-difference line-sequential signals are processed through equalizer circuits 232 and 242, limiter circuits 233 and 243, frequency demodulation circuits 234 and 244, LPFs 235 and 245 and deemphasis circuits 236 and 246 back into their original color-difference line-sequential signals.

The luminance signals including the sync signals and output from the deemphasis circuits 220 and 226 are supplied to sync signal eliminating circuits 291 and 292 to have sync signals removed therefrom. After that, the luminance signals are supplied to analog-to-digital (A/D) converters 227 and 228 and are also supplied to LPFs 229 and 230 to have redundant frequency components removed therefrom. The outputs of the LPFs 229 and 230 are supplied to adders 237 and 247 respectively to be added to the color-difference line-sequential signals output from the deemphasis circuits 236 and 246. As a result, the adders 237 and 247 output a red signal R and a blue signal B one after another to A/D converters 238 and 248. Further, to ensure that, in the above-stated addition process, the luminance signal and the color-difference line-sequential signal have their corresponding parts added together, their time bases are caused to coincide with each other by means of a delay circuit which is not shown.

The BPFs 271 and 272 extract the reference signals from the reproduced signals supplied from the field change-over switches 213 and 214 and supply the extracted reference signals to a writing clock signal generator 273. The writing clock signal generator 273 forms writing clock signals for the A/D converters 227, 228, 238 and 248 by using these reference signals. The writing clock signal generator 273 operates as described below:

The reproduced signal obtained from the recording track of the magnetic disc 286 by the magnetic head 201 or 203 and the reproduced signal obtained by the magnetic head 202 or 204 have time base variations. The reference signals separated by BPFs 271 and 272 from these reproduced signals also have the same time base variations. Therefore, in order to cause the A/D converters 227, 228, 238 and 248 to perform A/D conversion according to the time base conversions, writing clock signals are formed by a PLL (phase-locked loop) circuit provided within the writing clock signal generator 273 in phase with the reference signals separated by the BPF 271 and 272.

The writing clock signals thus formed are supplied respectively to phase fine-adjusting circuits 277 and 278. The phase fine-adjusting circuits 277 and 278 are arranged to permit the phases of the writing clock signals to be finely adjusted by operating the operation part 276. This arrangement enables the operator to make fine adjustment of the phases of the writing clock signals to their optimum states through the phase fine-adjusting circuits 277 and 278 by operating the operation part 276 while watching images on a monitor for confirmation.

The writing clock signal output from the phase fine-adjusting circuit 277 is supplied to A/D converters 227 and 238, and the writing clock signal output from the phase fine-adjusting circuit 278 is supplied to A/D converters 228 and 248. These A/D converters A/D-convert the luminance signals, the R signal and the B signal on the basis of the writing clock signals. After that, digital luminance signals output from the A/D converters 227 and 228 are supplied to a memory 250. Digital R and B signals output from the A/D converters 238 and 248 are supplied to another memory 251. Meanwhile, memory control circuits 252 and 254 have been set into their writing control states by instructions from the system controller 275. The memory control circuits 252 and 254 operate on the basis of the writing clock signals output from the phase fine-adjusting circuits 277 and 278 to designate writing addresses for the memories 250 and 251. The signals are stored at the designated addresses by these memories 250 and 251.

The two-frame amount of digital luminance signal obtained from the signals reproduced from four recording tracks on the magnetic disc 286 is thus stored in the memory 250, while the two-frame amount of R and B signals are stored in the memory 251. When the completion of this storing process is detected at the system controller 275 by counting the writing clock signals output from the phase fine-adjusting circuits 277 and 278, the system controller 275 brings the memory control circuits 252 and 254 into their reading control states and, in addition to that, instructs interpolation computing circuits 253 and 255 to start an interpolating process.

Figure 8A:
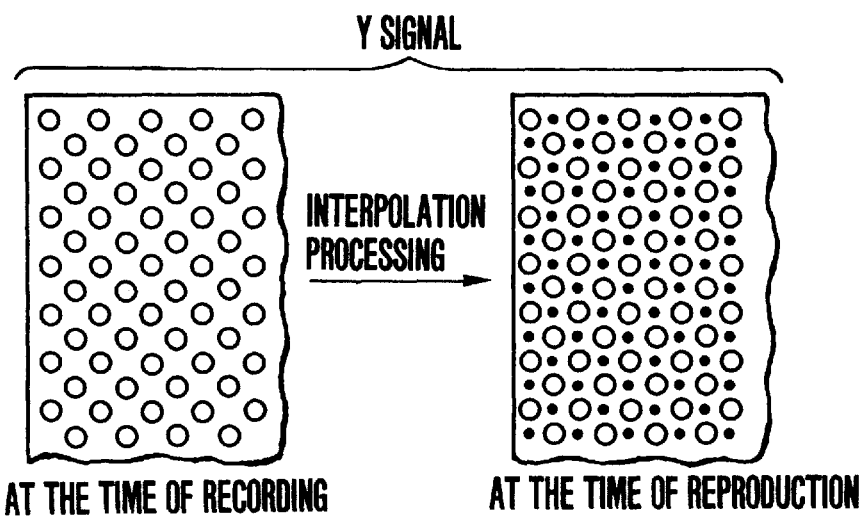
FIGS. 8(A), 8(B) and 8(C) show the allocation of picture elements corresponding to high-definition image signals recorded on the magnetic disc as in relation to the allocation of picture elements to be interpolated during reproduction.
Figure 8B:
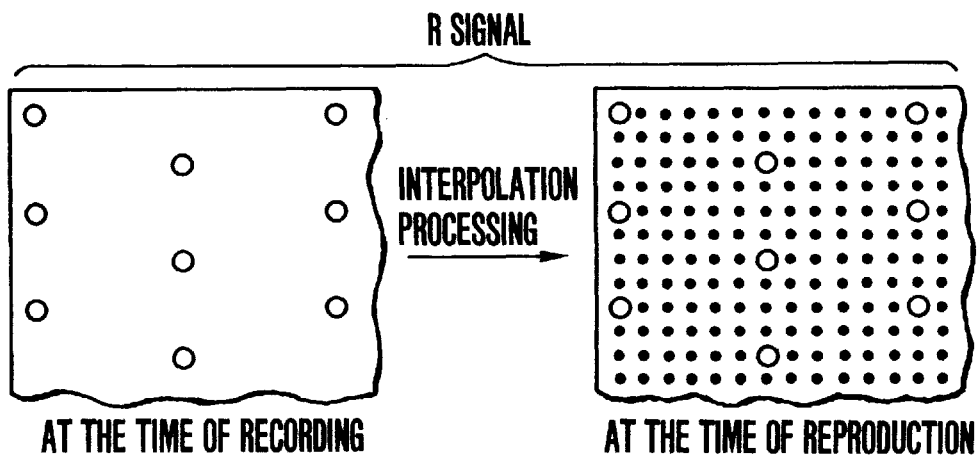
Figure 8C:
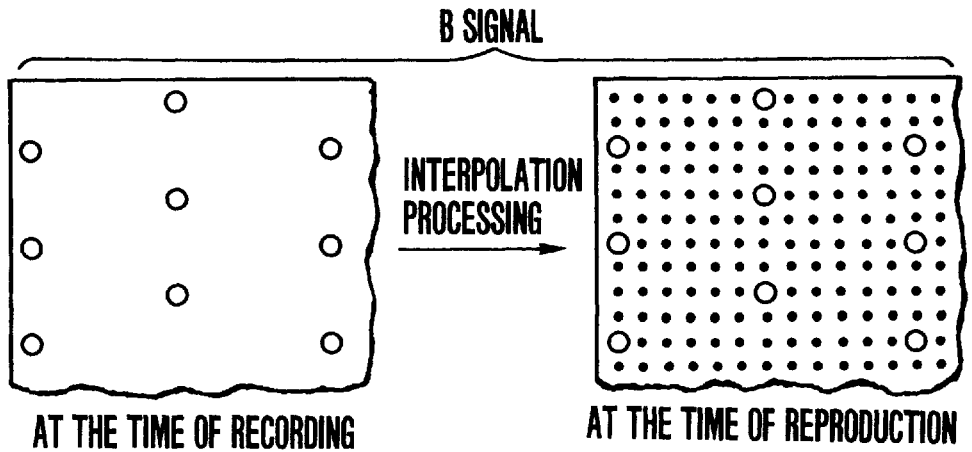

The embodiment performs the interpolating process in the following manner: The positions of picture elements on the picture corresponding to the digital luminance signal stored in the memory 250 are as indicated by circle marks on the right side of FIG. 8(A). The positions of picture elements on the picture corresponding to the R and B signals stored in the memory 251 are as indicated by circle marks on the right sides of FIGS. 8(A) and 8(B). For the interpolating process, interpolation filters are used. The interpolation filters are formed by using the values of picture element data represented by the circle marks which are located around dot marks and are arranged to interpolate picture element data located in positions represented by the dot marks. The interpolation computing circuits 253 and 255 instruct the memory control circuits 252 and 254 to read out from the memories 250 and 251 the picture element data necessary for the interpolation process to be carried out with the above-stated filters and to supply the data to the interpolation computing circuits 253 and 255. In response to the instructions from the interpolation computing circuits 253 and 255, the memory control circuits 252 and 254 control the reading addresses of the memories 250 and 251 and supply the necessary picture element data to the interpolation computing circuits 253 and 255. The interpolation computing circuits 253 and 255 then form interpolation picture element data corresponding to the dot marks of FIGS. 8(A), 8(B) and 8(C) and then supply the interpolation picture element data to the memories 250 and 251. In this instance, the memory control circuits 252 and 254 supply the memories 250 and 251 with writing addresses for storing the interpolation picture element data. The memories 250 and 251 then store the interpolation picture element data accordingly.

With the interpolation process performed in the above-stated manner, picture element data for about 1000×1000 picture elements per one picture is held by the memories 250 and 251. Compared with the luminance signals, the chrominance signals have less amounts of information. The resolution of the chrominance signals, therefore, cannot be increased as they require a greater amount of interpolation picture element data to be formed by the interpolation process. However, this does not present any serious problem as the deterioration in picture quality is not excessively conspicuous because of the characteristic of the visual sensations of man.

After completion of the interpolation process which is carried out on the memories 250 and 251 in the above-stated manner, the system controller 275 instructs a reading clock signal generator 274 to supply the reading clock signal to the memory control circuits 252 and 254. Then, the memory control circuits 252 and 254 cause the digital luminance signal and the digital R and B signals to be read out from the memories 250 and 251 in synchronism with the reading clock signal and to be supplied to a signal forming circuit 256.

The signal forming circuit 256 is composed of a matrix circuit, a sync signal adding circuit, etc. and is arranged to form video signals in varied forms by using the digital luminance, R and B signals received. These video signals are produced with sync signals added thereto. In the case of this embodiment, there are provided a digital output terminal 257 for outputting a digital video signal for a printer, a personal computer, etc.; a high-definition television output terminal 259 for outputting an analog video signal conforming to high-definition television standards, an RGB output terminal 261 for outputting an analog RGB signal; and an NTSC output terminal 263 for outputting an analog video signal conforming to the NTSC system. The operator is required to select one of the various output forms of the video signal by means of the operation part 276. With one of the output forms thus selected by the operator, the system controller 275 gives instructions to the signal forming circuit 256 in accordance with the output form of the video signal which has been selected by the operator. In response to the instructions, the signal forming circuit 256 converts the digital luminance signal and the R and B signals into the selected video signal output form and also adds the sync signals to the video signal. In a case where the video signal is to be output in the analog signal form, the above-stated signals are converted into analog signals by digital-to-analog (D/A) converters 258, 260 and 262 before they are output from applicable output terminals.

Figure 11:
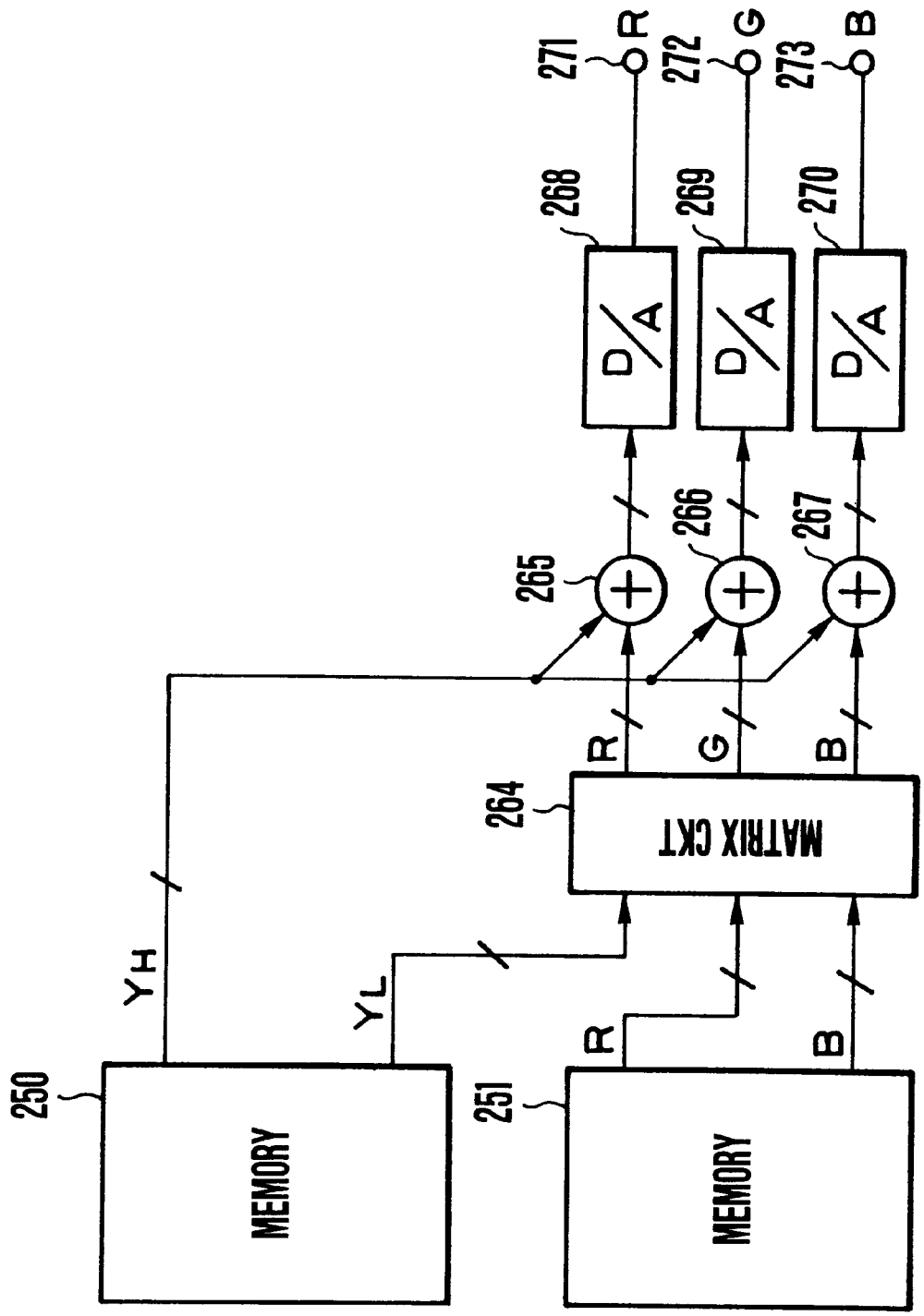
FIG. 11 is a circuit diagram showing in outline the arrangement of a signal forming circuit included in the same embodiment.

Further, in a case where the embodiment is required to output RGB signals, a digital luminance signal YH which is a high frequency band component and a digital luminance signal YL which is a low frequency band component are separately read out from the memory 250 which stores the digital luminance signal as shown in FIG. 11. The digital luminance signal YH is supplied to adders 265, 266 and 267. Meanwhile, the digital luminance signal YL is supplied to a matrix circuit 264 along with the digital R and B signals read out from the memory 251. The signals YL, R and B are converted into digital R, G and B signals at the matrix circuit 264. The digital R, G and B signals are supplied to the adders 265, 266 and 267 to be added to the digital luminance signal YH. The outputs of these adders 265, 266 and 267 are converted into analog signals by D/A converters 268, 269 and 270. After D/A conversion, the R signal is output from an output terminal 271, the G signal from an output terminal 272 and the B signal from an output terminal 273, respectively.

As described above, in forming the R, G and B signals, the high frequency band component of the luminance signal is arranged to be added to the R, G and B signals obtained by using the low frequency band component of the luminance signal. The loss of the high frequency band component of the luminance signal which takes place during the process of conversion can be lessened by this arrangement. This enables the conversion process to be carried out without causing much picture quality deterioration. Further, the addition coefficient of the digital luminance signal YH which is to be added by the adders 265, 266 and 267 does not have to be "1".

The reproducing part of the electronic still video camera system of FIGS. 7, 7(A) and 7(B) operates in the above-stated manner in reproducing the high-definition image signal recorded on a magnetic disc in the track pattern as shown in FIG. 6(A) by the recording part shown in FIG. 1. In reproducing an image signal which conforms to the format of the conventional electronic still video camera system, only the circuit elements that participate in processing the reproduced signals obtained by the magnetic heads 202 and 203 of FIG. 7(A) are used. In a case where the high-definition image signal is recorded on the magnetic disc in another track pattern which is shown in FIG. 6(B), the reproducing operation is performed as follows: Referring to FIG. 7(A), the magnetic head 202 is connected to the transformer 207 and the magnetic head 203 to the transformer 206. Then, either the circuit elements participating in processing reproduced signals obtained by the magnetic heads 201 and 202 or the circuit elements participating in processing reproduced signals obtained by the magnetic heads 203 and 204 are used. This operation is about the same as the high-definition image signal reproducing operation described in the foregoing and, therefore, does not require detailed description.

Further, the selection between the reproduction of a normal image signal and that of a high-definition image signal can be made by operating the operation part 276 to instruct the system controller 275 to perform a reproducing operation according to the result of selection.

The electronic still video camera system which is arranged according to this invention as described in the foregoing is capable of recording and reproducing a high-definition image signal in conformity to the format of the electronic still video camera system without being affected by any cross talk taking place between the magnetic heads during the process of recording. The embodiment of the invention is also capable of restoring the high-definition image signal to its original state without being affected by any time base variations which take place during the process of reproduction.

In the case of the embodiment described, four magnetic heads are used. However, in accordance with the invention, the number of heads is not limited to four. The invention is likewise applicable to an apparatus arranged to record or reproduce an image signal on or from a magnetic disc by gradually shifting two magnetic heads. Further, while the embodiment described uses one solid-state image sensor in the image sensing part thereof, the invention is applicable also to an apparatus of a three-plate or two-plate type using three or two solid-state image sensors.

Further, while the embodiment described uses a filter arranged as shown in FIG. 2, the filter may be replaced with a filter which is arranged as shown in FIG. 9 or as shown in FIG. 10 and is usable for forming the luminance signal and the R and B signals. Referring to FIG. 9, a reference symbol Y denotes filter parts provided for luminance; a symbol Ye for yellow; and a symbol Cy for cyan. In FIG. 10, the symbol Y denotes filter parts for luminance; a symbol R for red; and the symbol Cy for cyan.

In the case of this embodiment, the MOS type solid-state image sensor having about 1000 picture elements in the horizontal direction and about 1000 picture elements in the vertical direction. One-field amount of the image signal is recorded in two recording tracks on a magnetic disc by reading out a two-line amount of the image signal corresponding to the picture elements aligned in the horizontal direction at the same time and at intervals of two lines. However, the invention is not limited to this arrangement. In a case where a MOS type solid-state image sensor of the TSL (transversal signal line) type is used, this method may be changed as follows: An N (N: an integer which is not less than 2)—line amount of an image signal is formed by simultaneously reading out different picture elements for each line and is output at intervals of N lines to be recorded in N number of recording tracks on a magnetic disc.

Further, the embodiment has been described as arranged to record image signals formed by the solid-state image sensor. However, the invention is applicable also to an apparatus of the kind arranged to temporarily store an image signal in an image memory or the like; to read out the stored image signal in the same manner as the method of reading out the image signal from the solid-state image sensor as described in the foregoing; and to record the read-out image signal on a recording medium.

As described in the foregoing, the image signal recording apparatus according to this invention has interchangeability with the conventional format and is capable of recording a video signal on a recording medium with a high degree of density while ensuring a higher degree of image quality not only for the luminance component but also for the chrominance component of the signal.

What is claimed is:

1. An image signal recording apparatus for recording, on a recording medium, color image signals corresponding to an image in which one picture is composed of M horizontal scanning lines (M is a multiple of N N is an integer, N>1), comprising:
   a) color image signal output means for storing the color image signals for one picture and concurrently outputting N kinds of luminance component signals and N kinds of chrominance signals corresponding respectively to N number of horizontal scanning lines which are adjacent to each other on the picture;
   b) frequency-band limiting means for inputting the N kinds of luminance component signals and the N kinds of chrominance signals concurrently output from said color image signal output means, for limiting and outputting the frequency bands of the inputted N kinds of luminance component signals, respectively, and for limiting and outputting the frequency-bands of the inputted N kinds of chrominance signals to frequency bands lower than the limited frequency bands of the N kinds of luminance component signals, respectively;
   c) record color image signal forming means for forming and concurrently outputting N kinds of record color image signals by multiplexing the frequency-band limited N kinds of luminance component signals and N kinds of chrominance signals outputted from said frequency-band limiting means; and
   d) recording means for concurrently recording the N kinds of record color image signals concurrently outputted from said record color image signal forming means onto separate areas on the recording medium.

2. An apparatus according to claim 1, wherein said color image signal output means includes color image signal storing means for storing a color image signal for one picture and outputting said N kinds of luminance component signals and said N kinds of chrominance signals corresponding to the stored color image signal for one picture.

3. An apparatus according to claim 1, wherein said color image signal output means includes an image sensing element for sensing an object to output said N kinds of luminance component signals and said N kinds of chrominance signal corresponding to the object.

4. A color image signal recording apparatus for recording a color image signal on a recording medium, comprising:
   a) color image sensing means for sensing an object, for concurrently outputting a first luminance component signal and a first chrominance component signal corresponding to a first part of a color image of said object, and a second luminance component signal and a second chrominance component signal corresponding to a second part of the color image of said object, which is different from the first part;
   b) frequency-band limiting means for limiting the frequency bands of the first luminance component signal and the second luminance component signal concurrently outputted from said color image sensing means and for outputting the limited frequency bands of the first luminance component signal and the second luminance component signal and for limiting the frequency bands of the first chrominance component signal and the second chrominance component signal concurrently output from said color image sensing means to frequency bands which are narrower than the limited frequency bands of the first luminance component signal and the second luminance component signal, respectively, and outputting the limited frequency bands of the first chrominance component signal and the second chrominance component signal;
   c) record color image signal forming means for forming a first record color image signal by multiplexing the frequency-band limited first luminance component signal and the frequency-band limited first chrominance component signal output from said frequency-band limited means, for forming a second record color image signal by multiplexing the frequency-band limited signal luminance component signal and the frequency-band limited second chrominance component signal, and for concurrently outputting said first record color image signal and said second record color image signal; and
   d) record means for recording the first record color image signal and the second record color image signal concurrently outputted from said record color image signal forming means on separate areas on the recording medium.

5. An apparatus according to claim 4, wherein said recording medium includes a magnetic recording medium, and said recording means includes a first magnetic head for recording said first record color image signal and a second magnetic head for recording said second record color image signal.

6. An apparatus according to claim 5, wherein said magnetic recording medium includes a magnetic disk, and said first magnetic head and said second magnetic head are arranged in a line on a radius of said magnetic disk.

7. An apparatus according to claim 4, wherein said color image sensing means includes a first image sensing element and a second image sensing element having different picture element arrangements relative to the object and these elements are so arranged that said first image sensing element outputs the first luminance component signal and the first chrominance component signal corresponding to said first part of the color image of said object, and said second image sensing element outputs the second luminance component signal and the second chrominance component signal corresponding to said second part of the color image of said object, which is different from the first part.

8. A color image signal recording apparatus for recording, on a recording medium, color image signals corresponding to an image in which one picture is composed of M blocks (M is a multiple of N and N is an integer, N>1), comprising:
   a) color image signal output means for storing the color image signals for one picture and concurrently outputting N kinds of luminance component signals and N kinds of chrominance signals corresponding respectively to N number blocks which are adjacent to each other on the picture;
   b) frequency-band limiting means for inputting the N kinds of luminance component signals and the N kinds of chrominance signals concurrently output from said color image signal output means, for limiting and outputting the frequency bands of the inputted N kinds of luminance component signals, respectively, and for limiting and outputting the frequency-bands of the inputted N kinds of chrominance signals to frequency bands lower than the limited frequency bands of the N kinds of luminance component signals, respectively;

c) record color image signal forming means for forming and concurrently outputting N kinds of record color image signals by multiplexing the frequency-band limited N kinds of luminance component signals and N kinds of chrominance signals outputted from said frequency-band limiting means; and d) recording means for concurrently recording the N kinds of record color image signals concurrently outputted from said record color image signal forming means onto separate areas on the recording medium.

9. An apparatus according to claim 8, wherein said color image signal output means includes color image signal storing means for storing a color image signal for one picture and outputting said N kinds of luminance signals corresponding to the stored color image signal for one picture.

10. An apparatus according to claim 8, wherein said record medium includes a magnetic recording medium, and said recording means includes N number of magnetic heads for recording said N kinds of record color image signal.

11. An apparatus according to claim 10, wherein said magnetic recording medium includes a magnetic disk, and said N number of magnetic heads are arranged in a line on a radius of said magnetic disk.

12. An apparatus according to claim 8, wherein said color image signal output means includes an image sensing element for sensing an object to output said N kinds of luminance component signals and said N kinds of chrominance signals corresponding to the object.

* * * * *